United States Patent
Rydberg et al.

(10) Patent No.: US 6,241,433 B1
(45) Date of Patent: Jun. 5, 2001

(54) TOOL AND CUTTING HEAD FOR CUTTING MACHINING

(75) Inventors: Christer Rydberg; Jorma Koskinen, both of Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 09/468,905

(22) Filed: Dec. 22, 1999

(30) Foreign Application Priority Data

Dec. 22, 1998 (SE) .................................................. 9804459

(51) Int. Cl.$^7$ ................................................... B23B 51/00
(52) U.S. Cl. ........................... 408/233; 279/8; 408/231; 409/234
(58) Field of Search ................................ 82/160; 279/8; 408/231, 232, 233, 238, 239 A; 409/234

(56) References Cited

U.S. PATENT DOCUMENTS

| | | | |
|---|---|---|---|
| 1,016,116 | * 1/1912 | Walters | 408/231 |
| 3,878,905 | * 4/1975 | Schaumann | 175/383 |
| 3,973,861 | * 8/1976 | Sussmuth | 408/154 |
| 5,114,286 | * 5/1992 | Calkins | 408/233 |
| 5,399,051 | * 3/1995 | Aken et al. | 408/233 |
| 5,695,304 | * 12/1997 | Ebert | 408/233 |
| 5,769,577 | * 6/1998 | Boddy | 408/231 |
| 5,947,660 | 9/1999 | Karlsson et al. . | |
| 6,012,881 | * 1/2000 | Scheer | 408/233 |
| 6,109,841 | * 8/2000 | Johne | 408/233 |

FOREIGN PATENT DOCUMENTS

2523201A1 * 12/1976 (DE) .................................... 408/233

* cited by examiner

*Primary Examiner*—Steven C Bishop
(74) *Attorney, Agent, or Firm*—Burns, Doane, Swecker & Mathis, L.L.P.

(57) ABSTRACT

A tool for cutting machining includes a holder, a cutting head and a threaded fastener for fastening the cutting head to the holder. The cutting head is formed of injection molded cemented carbide and includes at least one cutting edge. The holder has a front surface and the cutting head has a support surface provided to releasably abut the front surface substantially in a radial plane. A central blind hole is provided in the support surface. An insert formed of a material softer than injection molded cemented carbide is secured in the blind hole. The insert includes a thread cooperating with a thread of the fastener for pulling the cutting head toward the holder in response to rotation of the fastener. By further tightening the fastener after the support surface abuts the front surface of the holder, the contact between the thread of the fastener and the thread of the insert forces the insert radially outwardly against a wall of the blind bore.

18 Claims, 4 Drawing Sheets

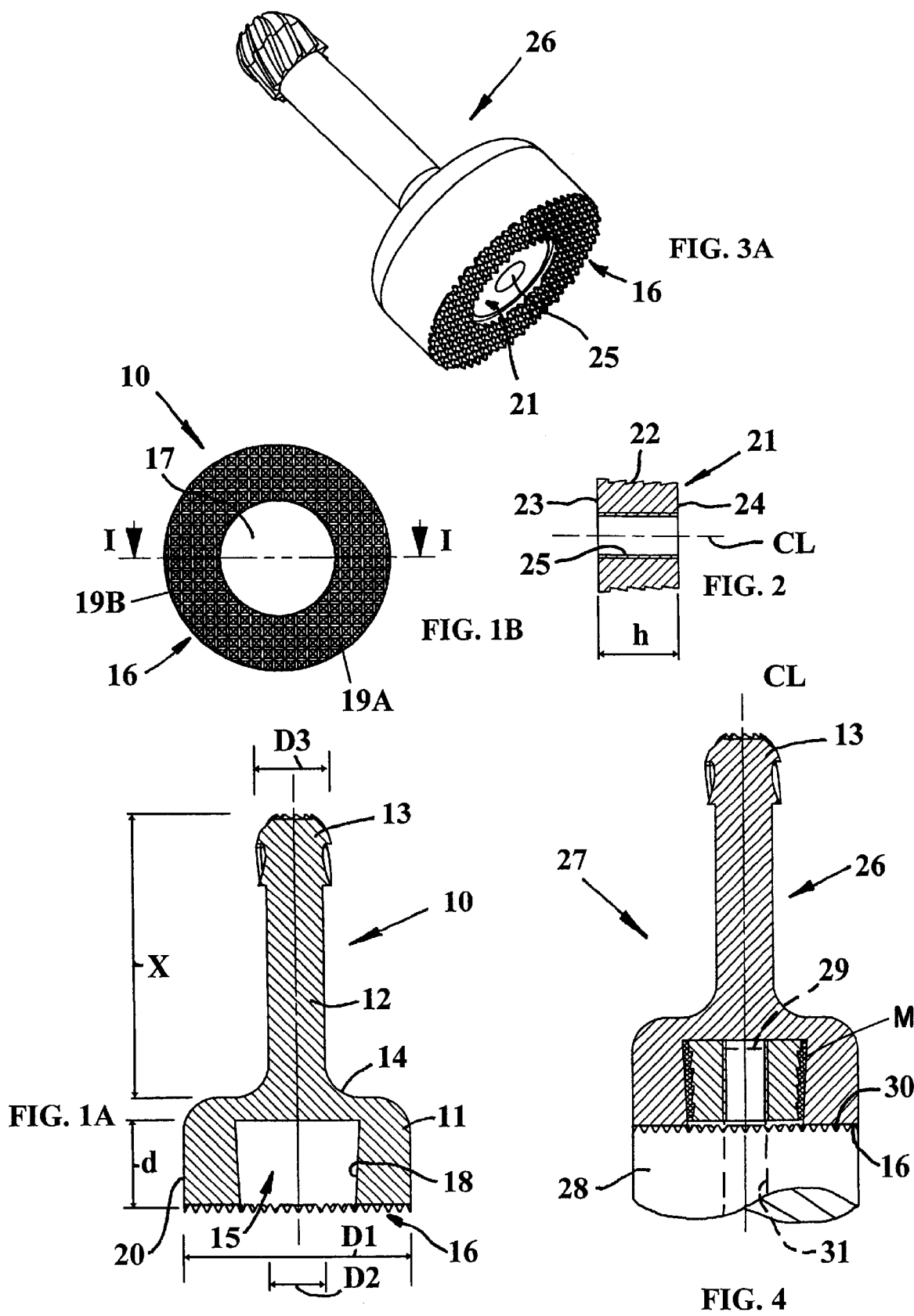

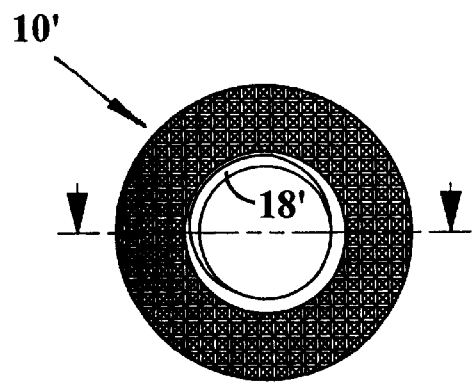
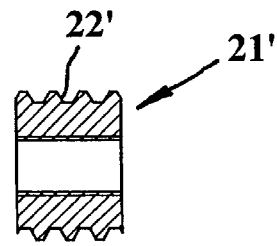
FIG. 6B　　　　　　　FIG. 7
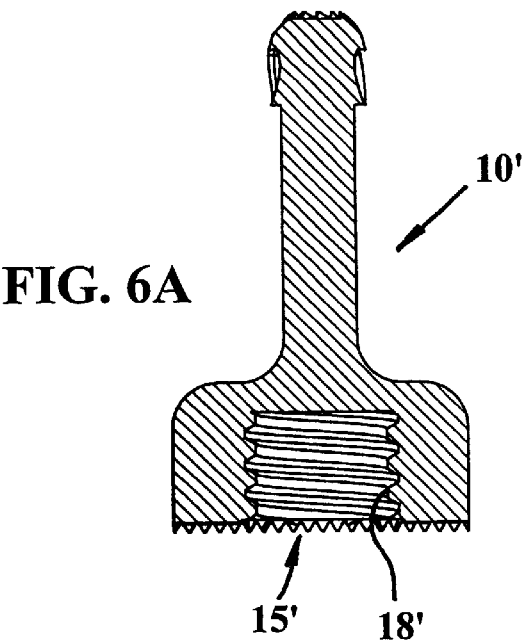
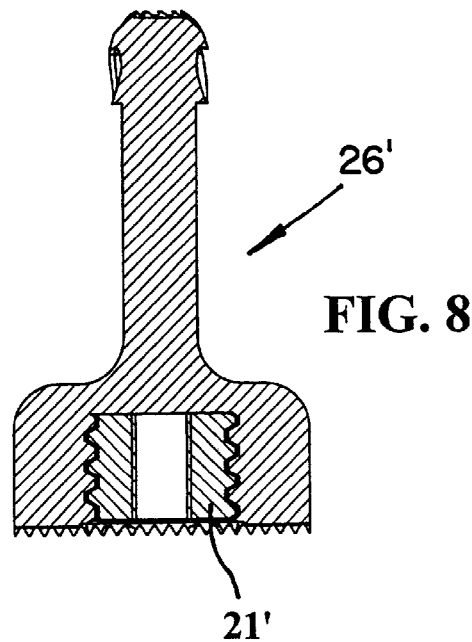
FIG. 6A　　　　　　　FIG. 8

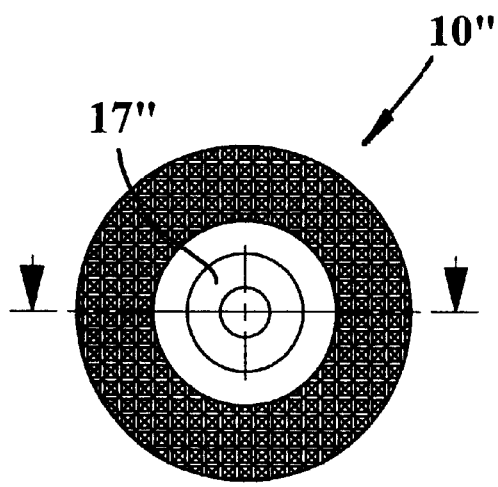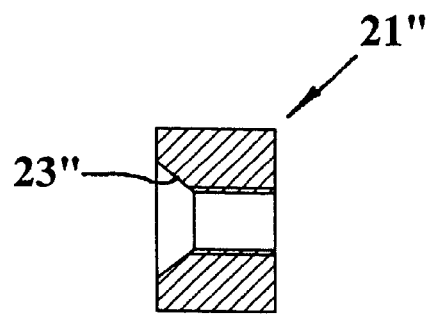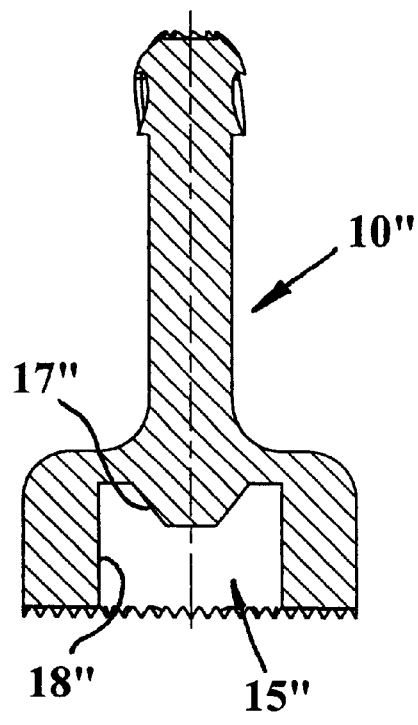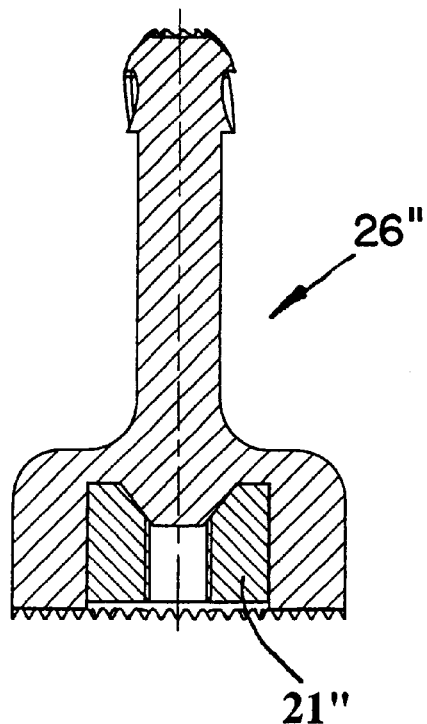
FIG. 9B
FIG. 10
FIG. 9A
FIG. 11

TOOL AND CUTTING HEAD FOR CUTTING MACHINING

BACKGROUND OF THE INVENTION

The present invention relates to a machining tool and a cutting head therefor.

PRIOR ART

Through U.S. Pat. No. 5,947,660 there is previously known a tool in which a cutting head is mounted on a rotatable holder. The cutting head has a blind hole formed in a rear surface thereof facing a front surface of the holder. A fastener screw extends axially through the holder and is threadedly connected within the blind hole to pull the rear surface and the front surface against one another. The rear surface of the cutting head and the front surface of the holder include ribs and grooves that form an interlocking relationship in response to rotation of the fastening screw. Such tools, when being of small dimensions have been found to lack sufficient strength or stability in the coupling between the cutting head and the tool body.

OBJECTS OF THE INVENTION

One object of the present invention is to provide a coupling for two tool parts, whereby a great load capacity can be transferred therebetween.

Another object of the present invention is to provide a tool which is continuously stable.

Still another object of the present invention is to provide a tool having good precision.

These and other objects have been achieved by a tool for cutting machining, the tool comprising a holder, a cutting head, and a fastener. The holder defines a longitudinal axis of rotation and includes a front surface oriented radially with respect to the axis. The cutting head includes a carrier body and an insert. The carrier body is formed of injection molded cemented carbide. The carrier body carries a cutting edge at its front end and includes a rear surface oriented radially relative to the axis and abutting the front surface of the holder. The rear surface has a central blind hole formed therein. The insert is secured in the blind hole and is formed of a material which is softer than that of the carrier body. The fastener is disposed in the holder and engages the insert for pulling the insert and the carrier body toward the holder.

The invention also pertains to the cutting head per se.

BRIEF DESCRIPTION OF THE DRAWINGS

The objects and advantages of the invention will become apparent from the following detailed description of preferred embodiments thereof in connection with the accompanying drawing in which like numerals designate like elements, and in which:

FIG. 1A shows a hard metal portion for a cutting head according to the present invention in a longitudinal cross-section taken along line I—I in FIG. 1B;

FIG. 1B shows the hard metal portion of FIG. 1 in an end view;

FIG. 2 shows an insert to cooperate with the hard metal portion;

FIG. 3A shows a cutting head according to the present invention in a perspective view;

FIG. 4 shows a forward end surface of a tool comprised of the cutting head of FIG. 3A and a holder, the cutting head shown in longitudinal cross-section;

FIG. 6A shows a hard metal portion of a second embodiment of a cutting head according to the present invention in a longitudinal cross-section;

FIG. 6B shows the hard metal portion of FIG. 6A in an end view;

FIG. 7 shows an insert to cooperate with the hard metal portion of FIG. 6A;

FIG. 8 shows a cutting head according to the second embodiment of the present invention in a longitudinal cross-section;

FIG. 9A shows a hard metal portion of a third embodiment of a cutting head according to the present invention in a longitudinal cross-section;

FIG. 9B shows the hard metal portion of FIG. 9A in an end view;

FIG. 10 shows an insert to cooperate with the hard metal portion of FIG. 9A; and FIG. 11 shows a cutting head according to the third embodiment of the present invention in a longitudinal cross-section.

DETAILED DESCRIPTION OF PREFERRED EMBODIMENTS OF THE INVENTION

Figure 5:
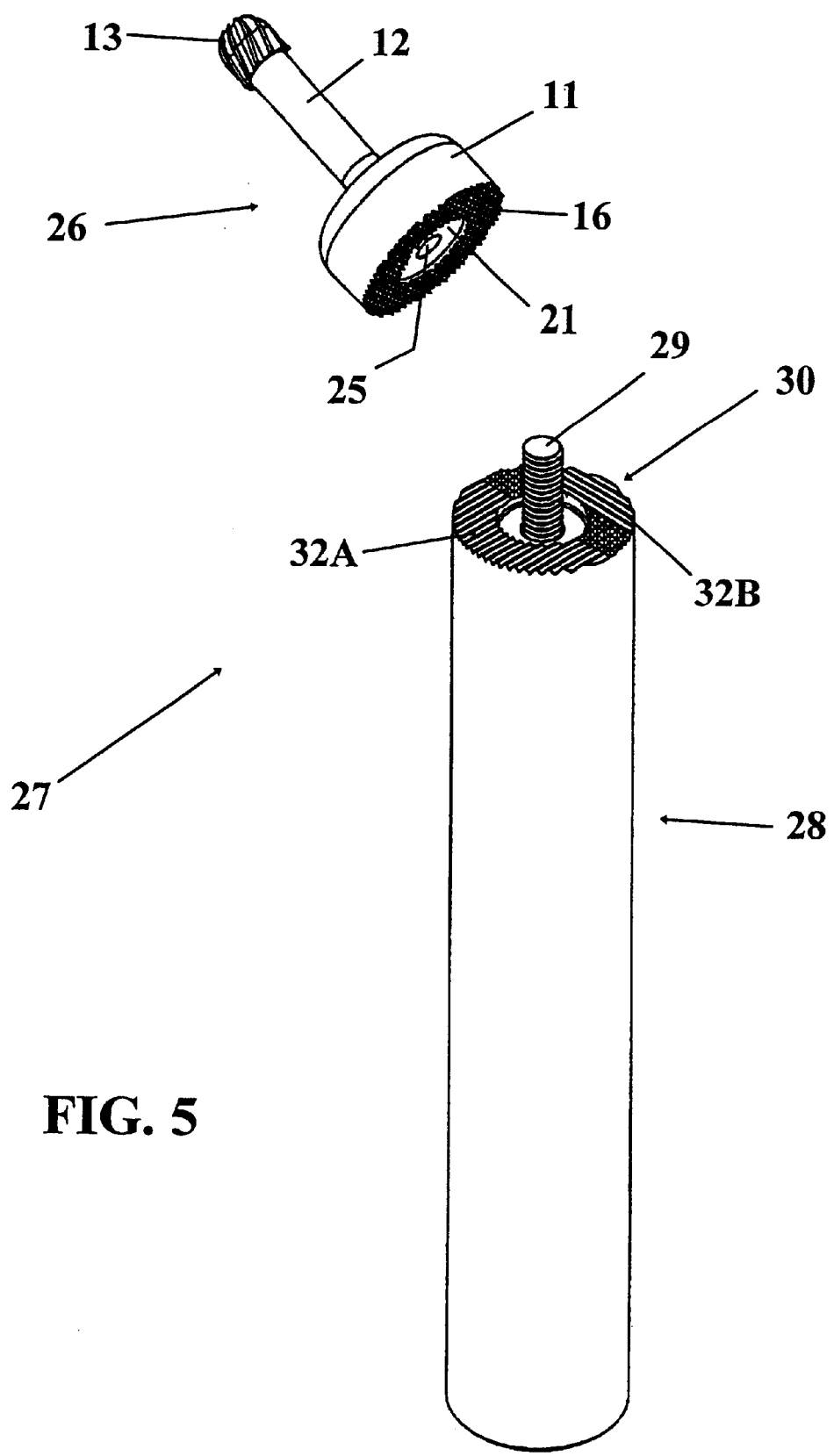
FIG. 5 shows the tool in an exploded view.

FIGS. 1A and 1B show a, preferably injection molded, hard metal (e.g., cemented carbide) carrier portion 10 according to the present invention. The hard metal carrier portion 10 has a cylindrical basic shape and comprises a base or support portion 11, which connects to an intermediate shank portion 12, which in turn connects to a cutting edge portion 13 provided at the free end of the carrier portion 10. The base 11 has a diameter D1, which is substantial greater than the diameter D2 of the intermediate part 12 and the diameter D3 of the cutting edge portion 13. The diameter D3 is somewhat greater than the diameter D2 to create space for chips during drilling or milling. The portion 13 has, in this example, the shape of a rotary file with a number of bent cutting edges but may alternatively have a drill geometry with only two edges extending towards the rotational axis CL. In case the portion 13 is a drill, it is an advantage if also the part 12 has chip flutes for conducting-away cuttings. The base 11 connects to the intermediate part 12 via a softly rounded shoulder portion 14. The axial distance X between the shoulder portion 14 and the cutting edge portion 13 defines the maximum machining depth.

A blind hole 15 is provided symmetrically about the rotational axis CL and is located centrally in the base 11 so as to open in a direction away from the intermediate part 12. The hole 15 terminates in a support surface 16 and has an axial depth d. The hole 15 has the cross-section of a dove tail, that is, the smallest diameter is located at the surface 16 such that a bottom 17 of hole 15 connects to a wall 18 of the hole at an acute angle. The blind hole and the cutting edges are integrated with the hard metal carrier portion 10.

The support surface 16 has a ring-like basic shape and comprises two rows of groove parts orient at right angles. The groove parts occupy substantially the entire support surface 16. Each groove part comprises a number of mutually separate, identical flutes or grooves 19A or 19B. The grooves 19A and 19B extend in respective directions perpendicular to each other. Substantially all of the grooves 19A, 19B intersect the jacket surface 20 of the bases 11 at two places. Each groove 19A, 19B is elongated and is substantially V-shaped in cross-section. That is, each groove has two flanks that connect to a bottom, via a sharp or rounded transition. The flanks form an acute angle with each other. The angle lies within the interval of 40° to 80°, preferably 55° to 60°. The number of grooves in each groove part depends on how the front surface of the holder is shaped, and the number is chosen in the interval of 5 to 30 grooves. The design of the groove parts gives a considerably greater specific surface than if the surface were planar. The groove parts cover at least 80%, preferably 90–100%, of the accessible area of the support surface 16. The function of the support surface 16 has been more closely described in PCT/SE98/01146 which hereby is incorporated in the present description as regards cooperation between the support surface 16 and a front surface of a shank, described below, where the coupling comprises two cooperating surfaces and means for forcing the surfaces together. The surfaces are profiled with grooves in order to allow locking by shape against each other.

A bushing or insert 21 of a material softer than injection molded cemented carbide is shown in FIG. 2. The bushing is preferably made of steel and has a cylindrical basic shape and has a certain dimension h in the axial direction. The jacket or outer peripheral surface of the bushing comprises a number of circumferentially extending grooves or segments 22. The bushing comprises first 23 and second 24 end surfaces. The end surfaces 23 and 24 are preferably parallel with each other and perpendicular to the rotational axis CL. Each of the segments 22, except for a cylindrical segment located closest to the first end surface 23, is in the form of a truncated conical part, whose imaginary tip (vertex) is directed outwardly towards the end surface 23. Each segment 22 has a base which is of greater diameter than the diameter of the narrowest part of the segment, whereby a sharp circumferential flange is formed. The end surface 23 defines the greatest diameter of the bushing and is smaller than the smallest diameter of the hole 15. The bushing has a central through-going, finely threaded boring 25. By "finely threaded" is here meant that the pitch of the thread is smaller than a "coarse or normal" pitch according to ISO-standard. For example, the "normal" pitch under M5 is according to standard 0.8 mm while the "fine" pitch is 0.5 mm.

The manufacture of a cutting head 26 according to the present invention from the hard metal carrier portion 10 and the bushing 21 is done as follows. The bushing 21 is inserted into the blind hole 15 such that the end surface 23 abuts against the bottom 17, whereafter melted brazing material M is inserted radially outside the bushing. Subsequently, the brazing material is cooled such that the bushing is fixed centrally in the blind hole 15, see FIGS. 3A and 4. It should be noted that since the height h of the bushing is shorter than the depth d of the hole, a gap will develop between the end surface 24 and the plane of the support surface 16, as is visible in FIG. 4.

In FIGS. 4 and 5 is shown a milling tool 27 according to the present invention. The milling tool 27 comprises a substantially cylindrical holder 28, the multi-edged cutting head 26 and a screw or other clamping means 29.

The holder 28 may be made of steel, cemented carbide or high speed steel. One free end of the holder 28 is intended to be fastened in a rotatable spindle (not shown) in a machine while the opposite other free end surface comprises a front surface 30 and has a non-threaded axial hole 31 therein. The front surface 30 has a circular basic shape and comprises two groove parts 32A, 32B. Each groove part covers a respective substantially half portion of the front surface 30 and comprises a number of mutually separate, identical flutes or grooves. The grooves of the groove parts have two main directions that are perpendicular to each other. The second groove part 32A is bordered by the first groove part 32B. Substantially each groove in the first groove part 32B intersects the jacket surface of the holder at two places while substantially each groove in the second groove part 32A intersects the jacket surface of the holder at one place. Each groove of the two groove parts is elongated and substantially V-shaped in cross-section.

The finely threaded hole 25 of the bushing 21 is provided to receive the screw 29 which fits loosely in the hole 31. The screw is formed as an internal pull rod with a threaded free end. Thereby, a possibility to provide cutting edges towards the rotational axis CL for drilling and milling is obtained. In the shown embodiment the groove parts 19, 32 have been made by direct-pressing and sintering or by grinding.

The tool 27 is mounted by pushing the support surface 16 of the cutting head 26 by hand against the front surface 30 of the holder 28 in one of four possible positions. Thereby, the grooves 19 of the cutting head are aligned with ribs formed between the grooves 32 of the holder. The screw 29 is brought against the threaded hole 25. During rotation of the screw 29 via a key (not shown) which is in engagement with a key grip of the screw (not shown) situated in an axially rearwards part of the holder (i.e., the lower part in FIG. 5), the cutting head will be drawn firmly against the front surface, i.e. the position according to FIG. 4 will be achieved wherein the ribs are locked in respective grooves. The cutting head 26 is now anchored against the holder 28 in a satisfactorily manner. The gap between the end surface 24 of the bushing and the front surface 30 allows elastic movement of the bushing during additional tightening of the screw. Therefore, the bushing will be wedged harder in the dove-tail hole. The fine thread 25 in engagement with the fine thread of the screw 29 allows relatively great traction in the joint.

The reason why only one surface, i.e., the surface 16, has a waffle pattern over its entire area is that the tool obtains a more distinct locking effect than if both of the surfaces 16, 30 were waffle patterned.

When the cutting head 26 must be replaced, the mounting process is reversed, whereafter the cutting head can be removed from the holder 28 and replaced by another cutting head. Thereby also the geometry of the cutting head can be changed to other embodiments, which all fit in the same holder. For example there can be used a chip-dividing cylindrical end mill head or thread milling cutter; a cylindrical head without chip dividing for example for end mill cutting or reaming; a head for grooving and a truncated conical head for end mill cutting of dove tail slots. Common for all these tools is that they replace conventional end mills in high speed steel where smaller dimensions (2 to 15 mm in diameter) often are desirable.

Although it is preferable that the surfaces 16 and 30 be formed with grooves to form the interlocking relationship, it is possible within the scope of the invention that those surfaces instead be planar (smooth).

FIGS. 6A–8 show alternative embodiments of a hard metal carrier portion 10' for a cutting head, a bushing 21' to cooperate with the carrier portion 10' as well as a cutting head 26' according to the present invention. The hard metal portion 10' is externally as described above. What differs relative to the earlier example is that the bushing 21' and the blind hole 15' cooperate via an external thread 22' and an internal thread 18', respectively. This means that brazing material is inserted in the thread 18' during the manufacture of the cutting head. The bushing is then threaded against the bottom of the blind hole 15', whereafter the brazing material is heated and cooled.

FIGS. 9A–11 show alternative embodiments of a hard metal carrier portion 10" for a cutting head, a bushing to cooperate with the portion as well as a cutting head 26" according to the present invention. Externally the hard metal carrier portion 10" is the same as described above. What differs relative to the earlier example is that the bushing 21" is wedged in the blind hole 15". This is done by providing the blind hole with a projecting central, conical projection 17", the tip of which is directed towards the mouth of the hole 15". The projection is brought to cooperate with a corresponding central, conical recess 23" of the bushing. Thereby the bushing is urged radially outwardly in the hole 15" and is plasticized against the wall 18". In this case it is possible to provide the hole with a dove-tail profile just as described above.

The bushings 21–21" in the above-described embodiments are secured in the respective blind holes 15–15" such that the insert, by the effect of the screw 29, is forced against the bore wall 18–18". This is evident since the threads in the screw and the insert during axial strain will be forcing the bushing apart, which then is pushed even harder against the bore wall.

Thus the present invention relates to a coupling for two tool parts such that a large traction can be transferred from the screw to the cutting head, a tool which is continuously rigid during use especially for smaller tool dimensions while maintaining good precision at mounting.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for cutting machining, comprising:
   a holder defining a longitudinal axis of rotation, and including a front surface oriented radially with respect to the axis;
   a cutting head mounted on the holder and including:
      a carrier body formed of injection molded cemented carbide, the carrier body carrying a cutting edge at its front end and including a rear surface oriented radially relative to the axis and abutting the front surface of the holder, the rear surface having a central blind hole formed therein and extending along the axis wherein an open end of the blind hole faces in a an axial direction, and
      an insert secured in the blind hole and formed of a material softer than the carrier body; and
   a fastener disposed in the holder and engaging the insert for pulling the insert and the carrier body toward the holder.

2. The tool according to claim 1 wherein the fastener is arranged to force the insert radially outwardly against a wall of the blind hole.

3. The tool according to claim 2 wherein the insert has an internal screw thread, the fastener having an external screw thread engaging the internal screw thread, whereby the external screw thread is able to pull the carrier body toward the holder in response to rotation of the fastener, and to force the insert radially outwardly in response to the fastener being further tightened after the rear surface has abutted the front surface.

4. The tool according to claim 1 wherein the front end of the carrier body defines a first diameter, and the front surface of the holder defines a second diameter substantially larger than the first diameter.

5. The tool according to claim 1 wherein the front end of the carrier body defines a first diameter, and the rear surface has a diameter substantially larger than the first diameter.

6. The tool according to claim 1 wherein the insert is brazed within the blind hole.

7. The tool according to claim 1 wherein the insert is connected in the blind hole by a screw thread.

8. The tool according to claim 1 wherein the insert is wedged in the blind hole.

9. The tool according to claim 1 wherein the insert has a longitudinal length smaller than a longitudinal length of the blind hole, whereby a gap exists between a rear end of the insert and the rear surface of the carrier body.

10. The tool according to claim 1 wherein the front and rear surfaces include meshing projections and recesses.

11. A cutting head for cutting machining comprising:
   a carrier body formed of injection molded cemented carbide and defining a longitudinal axis, the carrier body carrying a cutting edge at a first longitudinal end thereof, and including a second end opposite to the first end, the second end having a support surface oriented radially relative to the axis, the support surface having a central blind hole formed therein and extending along the axis wherein an open end of the blind hole faces in an axial direction, and
   an insert secured in the blind hole and formed of a material softer than the carrier portion, the insert including a structure adapted to cooperate with a fastener for fastening the carrier body to a holder.

12. The cutting head according to claim 11 wherein the first end defines a first diameter, and the support surface defines a diameter substantially larger than the first diameter.

13. The cutting head according to claim 11 wherein a smallest diameter of the blind hole is larger than the first diameter.

14. The cutting head according to claim 11 wherein the insert is brazed in the blind hole.

15. The cutting head according to claim 11 wherein the insert is secured in the blind hole by a screw thread connection.

16. The cutting head according to claim 11 wherein the insert is wedged in the blind hole.

17. The cutting head according to claim 11 wherein a longitudinal length of the insert is shorter than a longitudinal length of the blind hole.

18. The cutting head according to claim 11 wherein the support surface includes projections.

\* \* \* \* \*